(12) United States Patent
Klammler et al.

(10) Patent No.: US 9,404,783 B2
(45) Date of Patent: Aug. 2, 2016

(54) SEDIMENT BED PASSIVE FLUX METER (SBPFM)

(71) Applicant: University of Florida Research Foundation, Inc., Gainesville, FL (US)

(72) Inventors: Harald Rene Klammler, Gutenberg (AT); Kirk Hatfield, Gainesville, FL (US); Michael D. Annable, Gainesville, FL (US); Mark A. Newman, Gainesville, FL (US); Jaehyun Cho, Gainesville, FL (US); Leif E. Layton, Gainesville, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 24 days.

(21) Appl. No.: 14/666,757

(22) Filed: Mar. 24, 2015

(65) Prior Publication Data

US 2015/0268081 A1    Sep. 24, 2015

Related U.S. Application Data

(60) Provisional application No. 61/969,382, filed on Mar. 24, 2014.

(51) Int. Cl.
*G01F 1/704* (2006.01)
*G01F 1/76* (2006.01)

(52) U.S. Cl.
CPC ........................ *G01F 1/76* (2013.01)

(58) Field of Classification Search
CPC ............. G01F 3/38; G01F 1/704; G01F 1/74; G01F 1/32

USPC ........ 73/861.07, 861.04, 861.23, 152.28, 223
See application file for complete search history.

(56) References Cited

U.S. PATENT DOCUMENTS

| | | | | |
|---|---|---|---|---|
| 5,594,179 A * | 1/1997 | Marsh | G01F 1/704 | 73/861.05 |
| 6,401,547 B1 * | 6/2002 | Hatfield | G01F 1/704 | 73/64.56 |
| 7,281,422 B2 * | 10/2007 | Keller | E21B 47/10 | 166/250.02 |
| 7,334,486 B1 * | 2/2008 | Klammler | E21B 47/1015 | 73/861.07 |
| 8,069,715 B2 * | 12/2011 | Keller | E21B 47/1015 | 166/264 |
| 8,127,626 B2 * | 3/2012 | Hayes | G01N 1/10 | 73/863.25 |
| 8,424,377 B2 * | 4/2013 | Keller | E21B 43/103 | 73/152.28 |
| 9,008,971 B2 * | 4/2015 | Keller | E21B 47/10 | 702/11 |
| 2005/0235757 A1 * | 10/2005 | De Jonge | G01F 1/704 | 73/861.07 |

* cited by examiner

*Primary Examiner* — Jewel V Thompson
(74) *Attorney, Agent, or Firm* — Alston & Bird LLP

(57) ABSTRACT

Embodiments of the present invention provide a sediment bed passive flux meter (SBPFM) and associated methods. In one embodiment, an SBPFM is provided. The SBPFM comprises a casing. The casing comprises an intake portion, an exhaust portion, and an intermediate portion between the intake and exhaust portions. The SBPFM further comprises a permeable sock positioned within the intermediate portion of the casing and a sorptive matrix positioned within the sock. The sorptive matrix is impregnated with one or more tracers. The SBPFM is configured to passively intercept, but not retain, groundwater flow passing through the SBPFM from the intake portion to the exhaust portion.

23 Claims, 6 Drawing Sheets

SEDIMENT BED PASSIVE FLUX METER (SBPFM)

CROSS-REFERENCE TO RELATED APPLICATIONS

The present application claims the benefit of and priority to U.S. Provisional Patent Application No. 61/969,382, filed on Mar. 24, 2014, which is incorporated herein by reference in its entirety.

RELATED FIELD

Various embodiments of the present invention are directed toward providing a device (e.g., meter or sensor) capable of making passive in situ point-measurements of cumulative vertical groundwater and contaminant mass fluxes. A non-limiting example of such fluxes includes fluxes across the groundwater surface water interface, such as in the hyporheic zone of a stream bed.

BACKGROUND

The concept of passive sampling in the environment was first developed in the 1980s, and samplers started to be deployed in the field for research purposes in the 1990s. Since then, a variety of passive samplers have been used for monitoring contaminant concentrations in the water column, soil and sediment interstitial waters, and in the air at sites around the world. Their use in sediments to date has been primarily for research; however, passive samplers are also useful tools for assessing contaminant exposures and evaluating the potential for adverse environmental effects at certain sites of interest.

Aquatic sediment sites contaminated with semi-volatile organic compounds are difficult to characterize and manage. There is a tendency for contaminants to be retained within sediments for long periods of time and the hydrophobic nature of some of the key compounds (e.g., polycyclic aromatic hydrocarbons and polychlorinated biphenyls) makes detection and/or monitoring difficult. Current technologies identify groundwater discharge zones and estimate contaminant mass flux based on total concentration in bulk sediment. This is a generally accepted approach, although dissolved concentration in pore water is considered a more accurate measurement of bioavailable contaminants. Besides existing deficiencies with this approach, it is oftentimes quite time and personnel intensive.

Thus, a need exists to provide a more accurate and less time/labor intensive characterization of sediment pore water and bioavailable contaminant fluxes, which may be achieved through devices that are passive and self-contained in nature.

SUMMARY

Embodiments of the present invention provide a sediment bed passive flux meter (SBPFM) and associated methods. One aspect of the present invention provides a SBPFM device. In one embodiment, the SBPFM device comprises a casing. The casing comprises an intake portion, an exhaust portion, and an intermediate portion positioned between the intake portion and the exhaust portion. The SBPFM device further comprises a permeable sock positioned within the intermediate portion and a sorptive matrix positioned within the sock. The sorptive matrix is impregnated with one or more tracers. The SBPFM device is configured to passively intercept but not retain groundwater flow passing through the device form the intake portion and to the exhaust portion.

According to another aspect of the present invention, a method for measuring cumulative vertical groundwater and contaminant mass flux is provided. In one embodiment, the method comprises providing at least one sediment bed passive flux meter (SBPFM) device. The SBPFM device may comprise a casing. The casing may comprise an intake portion, an exhaust portion, and an intermediate portion positioned between said intake and said exhaust portions. The SBPFM may further comprise a permeable sock positioned at least within said intermediate portion and a sorptive matrix positioned within said sock. The sorptive matrix is impregnated with one or more tracers. The SBPFM device is configured to passively intercept but not retain groundwater flow passing through the device from the intake portion and to the exhaust portion. The method further comprises driving the device into a deployed position in uppermost sediments at a groundwater surface water interface so as to intercept at least vertical water and contaminant mass fluxes moving through the sediments; maintaining the device in a stationary fashion in the deployed position for a period of time; and removing the device from the deployed position. The method further comprises extracting and quantitatively measuring a residual mass of the one or more tracers impregnated in the sorptive matrix so as to facilitate calculation of at least one of a direction or a magnitude of the cumulative vertical groundwater flux.

According to another embodiment, a sediment bed passive flux meter (SBPFM) device is provided. In one embodiment, the SBPFM device comprises a permeable tube and a screened central tube positioned within the permeable tube such that a central axis of the permeable tube and a central axis of the screened central tube are substantially aligned. The permeable tube and the screened central tube define an annular region therebetween. The SBPFM device further comprises a sorptive matrix positioned within the annular region and is impregnated with one or more tracers. The device is configured to passively intercept but not retain groundwater flow passing through the device entering via the permeable tube and exiting via the screened central tube.

BRIEF DESCRIPTION OF THE DRAWINGS

Reference will now be made to the accompanying drawings, which are not necessarily drawn to scale, and wherein.

DETAILED DESCRIPTION OF VARIOUS EMBODIMENTS

Various embodiments of the present invention will now be described more fully hereinafter with reference to the accompanying figures, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

A) General Overview

Figure 1:
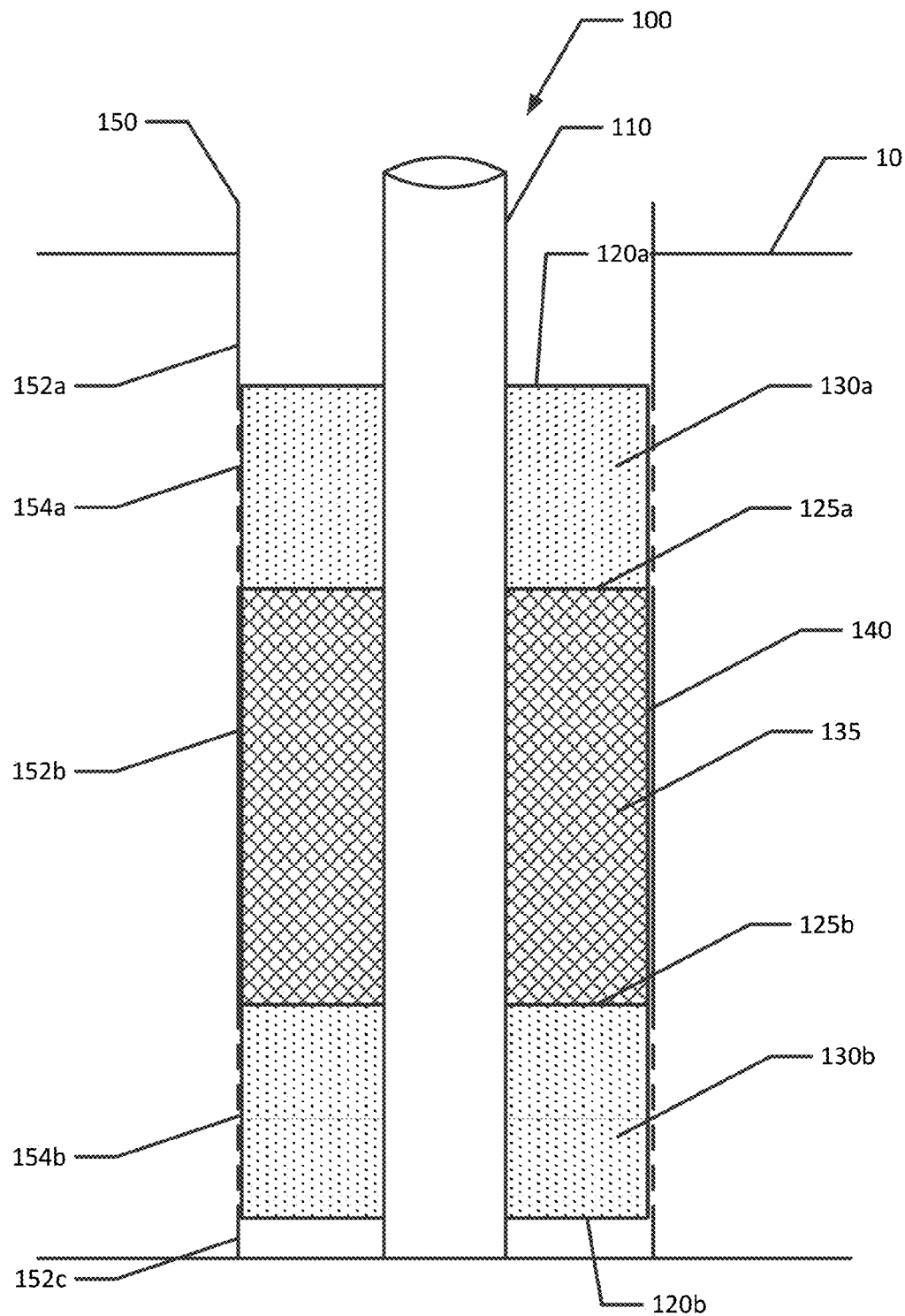
FIG. 1 is an illustration of an exemplary sediment bed passive flux meter (SBPFM) according to various embodiments.

According to various embodiments, the Sediment Bed Passive Flux Meter (SBPFM) is a device capable of making passive in situ point-measurements of cumulative vertical groundwater and contaminant mass fluxes. Examples include the non-limiting examples of fluxes across the groundwater surface water interface, such as in the hyporheic zone of a stream bed, the sediments of a lake or reservoir, the sediments of a wetland or the submarine ground. A still further non-limiting example includes other sub-surface flows, such as flow within aquifers and vertical flow across aquifer aquitard interfaces. The device is, in certain embodiments (see FIG. 1) a self-contained permeable unit that passively intercepts groundwater flow without retaining it. With continued reference to FIG. 1, it may be seen that the interior of the device comprises a sorptive matrix that is contained within a permeable mesh or sock. The sorptive matrix is impregnated with one or more fluid-soluble tracers that are leached from the sorbent as water flows vertically (e.g., either upward or downward) through the device. The flow, in certain embodiments is at a rate proportional to the ambient fluid flux. With reference still to FIG. 1, it may be seen that according to various embodiment the sorbent and the sock of the SBPFM device are contained within a solid casing, with two or more intake and exhaust screened intervals.

Prior to operation, the device is driven into the uppermost sediments at the groundwater surface water interface (e.g., in the streambed), so as to intercept vertical water and/or contaminant mass fluxes moving through the sediments. Observation periods may range from hours to weeks, although any of a variety of durations may be envisioned, as may be desirable or beneficial for a particular scenario. Regardless of the duration, following what may be referred to as an operational or deployment period, the SBPFM device may be removed and the sorbent segmented and extracted to quantify the residual mass of the impregnated tracers and any contaminants present therein. In this manner, the direction and magnitudes of cumulative vertical groundwater flux and/or contaminant mass flux may be calculated.

According to various embodiments, the sediment bed passive flux meter (SBPFM) operates using the same general principles as passive flux meters in general, a direct method for monitoring of cumulative, horizontal water and contaminant mass fluxes through porous media. The passive flux meter is a self-contained permeable unit that is inserted into a well or boring so that it intercepts horizontal groundwater flow through the device. Both devices are designed to passively intercept water fluxes for the purpose of calculating cumulative water and contaminant mass fluxes. Both are comprised of a sorbent matrix that is pre-equilibrated with tracers that are leached from the sorbent at rates proportional to the water flux and that retains contaminants in the water that flows through the device. However, the SBPFM includes several advantages and structural improvements, as described elsewhere herein.

During use according to various embodiments, the sediment bed passive flux meter (SBPFM) provides discrete point measurements of the cumulative water and contaminant mass flux through the bed of a stream (or other site, as detailed elsewhere herein). Measurements may be taken at multiple locations and spatially interpolated and integrated to estimate discharges through a spatial network covering a suspected contaminant discharge/recharge zone or stretch of a stream. The combined water and contaminant mass fluxes may then be used to assess groundwater-surface interactions in a stream for the purpose of monitoring attenuation, evaluating remediation, assessing risk, conducting mass balances, and the like.

According to various embodiments, the SBPFM described herein may be equipped with one or more pressure transducers in the mesh screens (or otherwise inside the casing). The one or more pressure transducers may be configured to provide additional information regarding changes in flow direction during use of the SBPFM, either automatically, in a real-time fashion, periodically, or otherwise, however as may be desirable for certain scenarios. As a non-limiting example, the one or more pressure transducers may be configured to validate SBPFM measured fluxes (as calculated upon extraction of the device) based on tracer losses, thus providing an additional layer of quality control and accuracy assurance.

B) Exemplary SBPFM

Reference will now be made to FIG. 1, which illustrates an example SBPFM 100. The SBPFM 100 comprises a casing 150, mesh sock 140, and central tube 110. The region within the mesh sock 140 and outside of the central tube 110 is divided into multiple annular regions (e.g., 130a,b and 135) that are separated by permeable mesh washers (e.g., 125a,b). At least some of the multiple annular regions (e.g., 130a,b and 135) contain at least a portion of the sorptive matrix. For example, in the illustrated embodiment, the sorptive matrix is disposed in the annular region 135. In some embodiments, some of multiple annular regions (e.g., 130a,b and 135) may contain an inert media having a high hydraulic conductivity. For example, in the illustrated embodiment, the inert media is disposed in regions 130a,b. Various features of the elements of the exemplary SBPFM will now be discussed in detail.

The SBPFM is contained within a casing 150. In various embodiments, a tight fit is formed between the mesh sock 140 and the casing 150. The casing 150 comprises one or more intake and/or exhaust intervals configured to allow groundwater to flow through the casing into and/or out of the SBPFM 100. For example, intake and/or exhaust intervals 154a,b are portions of the casing 150 configured to allow groundwater to flow into and/or out of the SBPFM 100. In some embodiments, the casing 150 also comprises one or more portions that are sealed so as to prevent groundwater from flowing through those portions of the casing 150. For example, solid intervals 152a,b,c are portions of the casing 150 that are sealed so as to prevent groundwater from flowing through those portions of the casing.

In various embodiments, the intake and/or exhaust intervals (e.g., 154a,b) comprise a plurality of perforations therein, allowing groundwater to flow through the intake and/or exhaust intervals of the casing 150. In some embodiments, the plurality of perforations comprises a plurality of spaced apart slits. For example, in one embodiment, the slits are spaced apart equally a distance of approximately one inch relative to one another. In other embodiments, the plurality of perforations may comprise a plurality of holes or other various perforations configured to allow groundwater to flow into or out of the SBPFM 100. In some embodiments, the intake and/or exhaust intervals (e.g., 154a,b) may be approximately one inch long sections along the length of the casing 150. In various embodiments, the size of the slits or holes in intake and exhaust intervals 154a,b may be configured to allow groundwater to pass through the casing, but prevent debris (e.g., pebbles, soil, and/or the like) from passing through the casing.

In various embodiments, the casing 150 may be made of PVC piping. In some embodiments, the casing 150 is cylindrical in nature and may have a circular or other cross-section. The length of the casing 150 may be appropriately sized to contain the mesh sock 140, the annular regions (e.g., 130a,b and 135), and at least a portion of the central tube 110. The diameter of the casing 150 may be appropriately sized to contain the mesh sock 140, the annular regions (e.g., 130a,b and 135), and the central tube 110. For example, the diameter of the casing 150 may be appropriately sized to form a tight fit with the mesh sock 140. The mesh sock 140 and its contents should fill the majority of the casing 150 such that a significant portion of the groundwater that enters the casing (e.g., via intake and exhaust intervals 154a,b) will interact with the mesh sock 140 and/or the contents of the annular regions. For example, approximately all of the groundwater that enters the casing (e.g., via intake and exhaust intervals 154a,b) may interact with the mesh sock 140 and/or the contents of the annular regions. In various embodiments, the casing 150 may be configured to provide structural support and/or rigidness to the SBPFM 100.

As illustrated in FIG. 1, the SBPFM 100 further comprises a mesh sock 140. The mesh sock 140 may be configured to allow ground water to pass therethrough and to contain the sorptive matrix and/or inert media therein. For example, the mesh sock 140 may be permeable to groundwater and tracers and/or contaminants dissolved therein, but may be impermeable to sorptive matrix and/or inert media. In various embodiments, the mesh sock 140 may be made of nylon or other appropriate material.

In various embodiments, the SBPFM 100 contains a central tube 110. In various embodiments, the central tube 110 may be approximately one-quarter inch in diameter. In other embodiments, the central tube 110 may be larger or smaller as appropriate for the application. In one embodiment, the central tube 110 is a stainless steel tube. In other embodiments, the central tube 110 may be a PVC tube, or tube made of other appropriate material. In various embodiments, the central tube 110 is configured to allow groundwater to flow through the SBPFM 100 during the installation and/or retrieval of the SBPFM.

As noted above, the region outside of the central tube 110 and within the mesh sock 140 is divided into multiple annular regions. The embodiment illustrated in FIG. 1 comprises three annular regions 130a,b and 135. The outer ends of the ends sections 130a,b are closed by caps or solid washers 120a,b. For example, the caps may be solid washers made of rubber or other appropriate material and configured to prevent the flushing of tracers during the deployment and retrieval of the SBPFM 100. In various embodiments, each cap may be positioned adjacent a peripheral end of an intake and/or exhaust interval.

The annular regions (e.g., 130a,b and 135) may be divided by mesh washers or discs (e.g., 125a,b) configured to allow groundwater to pass between the regions (e.g., 130a,b and 135) but to not allow sediment (e.g., inert media, sorptive matrix, and/or the like) to pass between the regions. For example, mesh washers 125a,b are permeable to groundwater, but are generally not permeable to the sorptive matrix. In one embodiment, the inert media is not disposed within the mesh sock 140, and the mesh washers or discs may comprise a portion of the mesh sock.

In various embodiments, the inert media may be disposed in annular regions 130a,b and the sorptive matrix may be disposed in annular region 135. Some embodiments will not include the inert media and sorptive matrix may be disposed in all of the annular regions. In such an embodiment, there may be only one annular region. In various embodiments, the inert media may be glass beads having a diameter of approximately one-sixteenth of an inch to approximately half an inch and/or the like. In various embodiments, the sorptive matrix may comprise granular activated carbon (GAC) impregnated with one or more fluid-soluble tracers. The inert media may have an approximately infinite hydraulic conductivity and the sportive matrix may have a hydraulic conductivity similar to that of the soil in which the SBPFM 100 is to be deployed. Therefore, the fluid flux (e.g., groundwater flux) through the SBPFM 100 is approximately equal to the ambient fluid flux (e.g., groundwater flux). In various embodiments, the glass beads and impregnated sorptive matrix may be packed into their respective annular regions via compaction and/or vibration to provide level portions with consistent material density.

As noted previously, the sorptive matrix may be impregnated with one or more fluid-soluble tracers. For example, the sorptive matrix (e.g., GAC) may be impregnated with one or more resident tracers and one or more internal tracers. When the SBPFM 100 is deployed, groundwater may pass through an intake and/or exhaust interval (e.g., 154a,b) and pass through the mesh sock 140. The groundwater may enter annular region 135 (either directly through the mesh sock 140 or via region 130a,b and mesh washer 125a,b) and dissolve portions of the one or more tracers. The groundwater may then flow out of annular region 135 (either directly through the mesh sock 140 or via region 130a,b and mesh washer 125a,b) and out through an intake and/or exhaust interval (e.g., 154a,b) carrying with it at least a portion of the tracer initially absorbed in the sorbent. Thus, the mass of the tracer within the SBPFM 100 when it is retrieved is lower than the mass of the tracer within the SBPFM at the deployment of the SBPFM. The ratio of the original mass of the tracer and the residual mass of the tracer may then be used to infer information regarding the flow of groundwater through the SBPFM 100 while the SBPFM was deployed. For example, the mass of resident tracer remaining in the sorptive matrix after retrieval of the SBPFM 100 is inversely proportional to the cumulative flow of groundwater through the SBPFM during the time that it was deployed. One or more resident tracers may be used having different sorption properties such that an array of information may be gathered regarding the flow of groundwater through the SBPFM 100 during the time the SBPFM is deployed and/or as a consistency check to help ensure the accuracy of the information inferred from the original mass to residual mass ratio. In various embodiments, the one or more resident tracers may be used to measure the flow of groundwater through the SBPFM 100 during the time the SBPFM is deployed and the one or more internal tracers may be used as a standard whereby changes in the mass ratio for the resident tracers may be assessed from measured changes in tracer mass ratios with respect to the internal tracer.

In various embodiments the one or more resident and/or internal tracers may be methanol, ethanol, isopropyl alcohol, tert-butanol, and/or 2,4-dimethyl-3-pentanol. For example, methanol, ethanol, isopropyl alcohol, tert-butanol may be used as resident tracers and 2,4-dimethyl-3-pentanol may be used as an internal tracer.

In various embodiments, as the groundwater flows through the SBPFM and interacts with the sorptive matrix, the groundwater may deposit one or more contaminants within the sorptive matrix. For example, contaminants may be deposited in the sorptive matrix, in one of the annular regions (e.g., 130a,b) having an inert media (e.g., glass beads) therein, and/or the like. Thus, analyzing the mass of contaminants deposited within the SBPFM during the deployment of the SBPFM can provide information regarding the amount of contamination present in the groundwater at the deployment site.

C) Exemplary Method of Using an SBPFM

Figure 2:
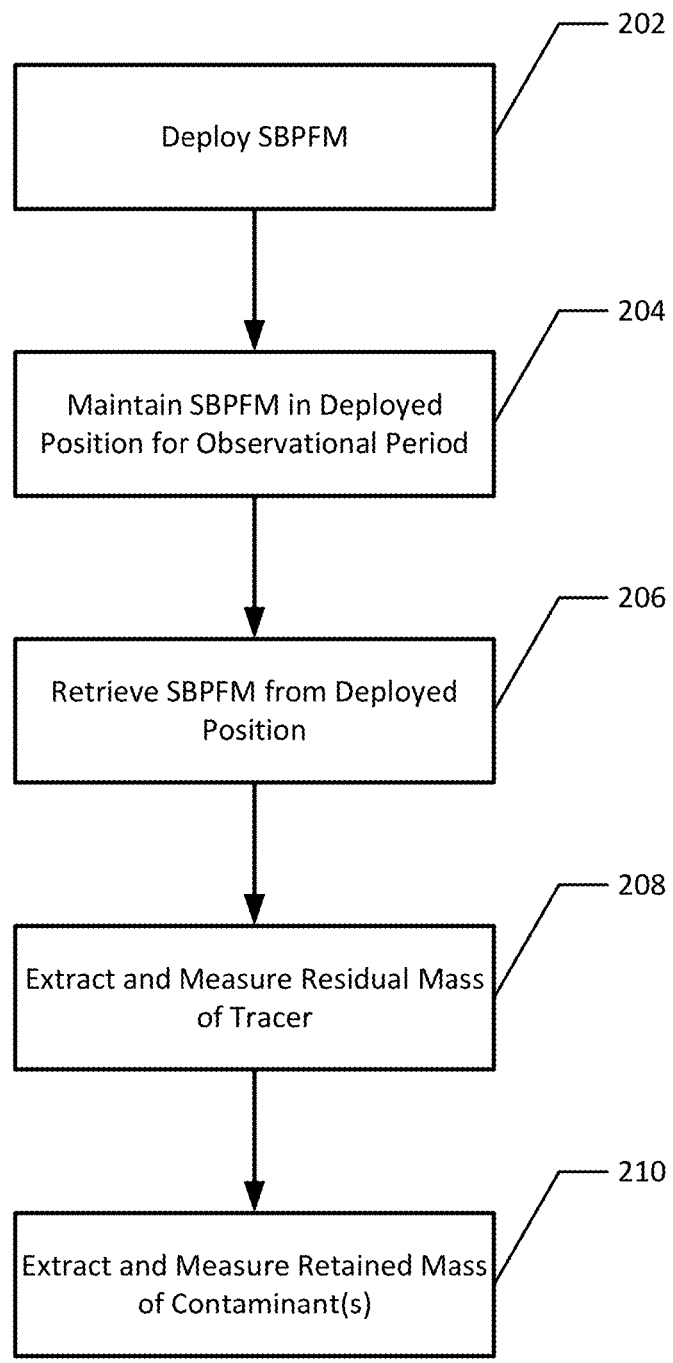
FIG. 2 is a flowchart showing procedures and operations that may be completed in accordance with various embodiments.

References will now be made to FIG. 2 which provides a flowchart of some operations and procedures that may be completed in accordance with an embodiment of the present invention. Starting at step 202, the SBPFM 100 is deployed. The SBPFM may be deployed such that the majority of the SBPFM 100 is below the water table or sediment surface 10. For example, all of the intake and/or exhaust intervals (e.g., 154a,b) may be wholly below the water table or sediment surface 10 at the time the SBPFM 100 is deployed. In some embodiments, a hole may be drilled into the ground at the desired deployed position and the SBPFM may be placed or driven into the prepared hole. In other embodiments, the SBPFM may be driven into the ground in the desired deployed position.

Figure 3:
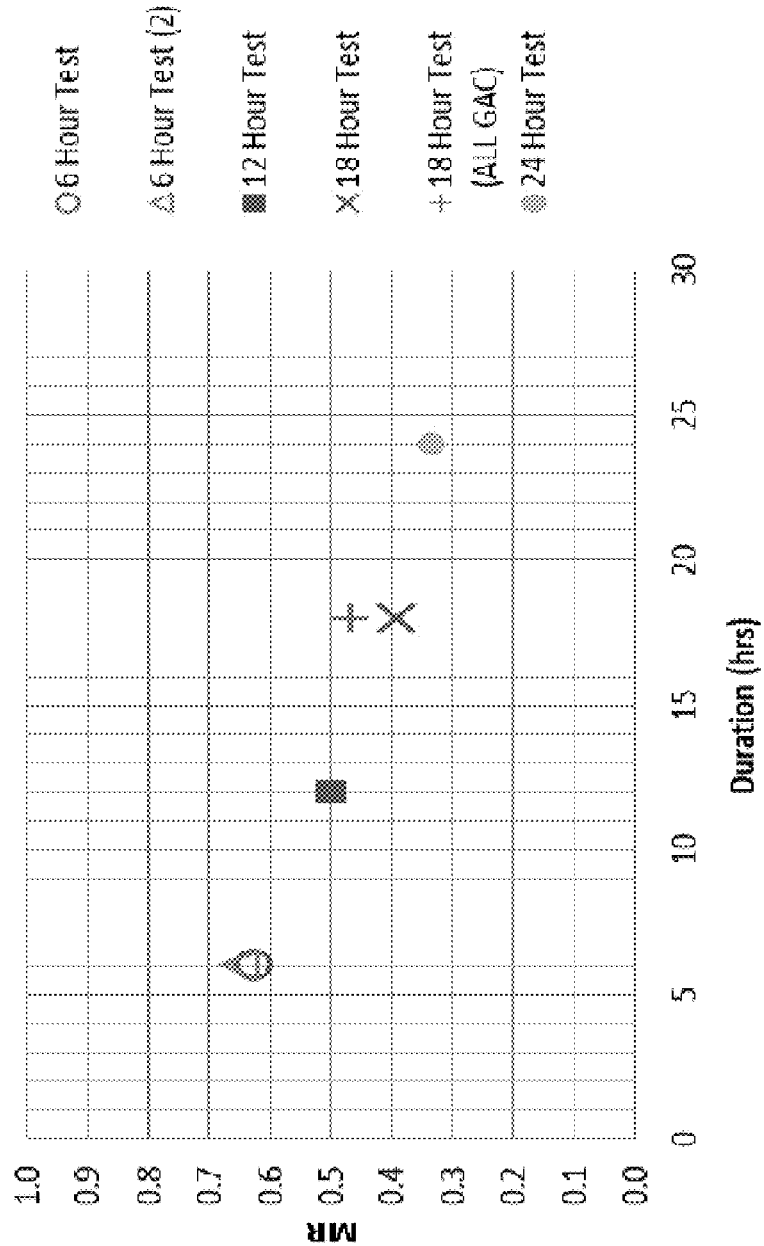
FIG. 3 is a chart illustrating exemplary results achieved via operation of the exemplary SBPFM of FIG. 1, detailing a mass remaining (MR) versus duration of testing, in the context of tert-butanol.
Figure 4:
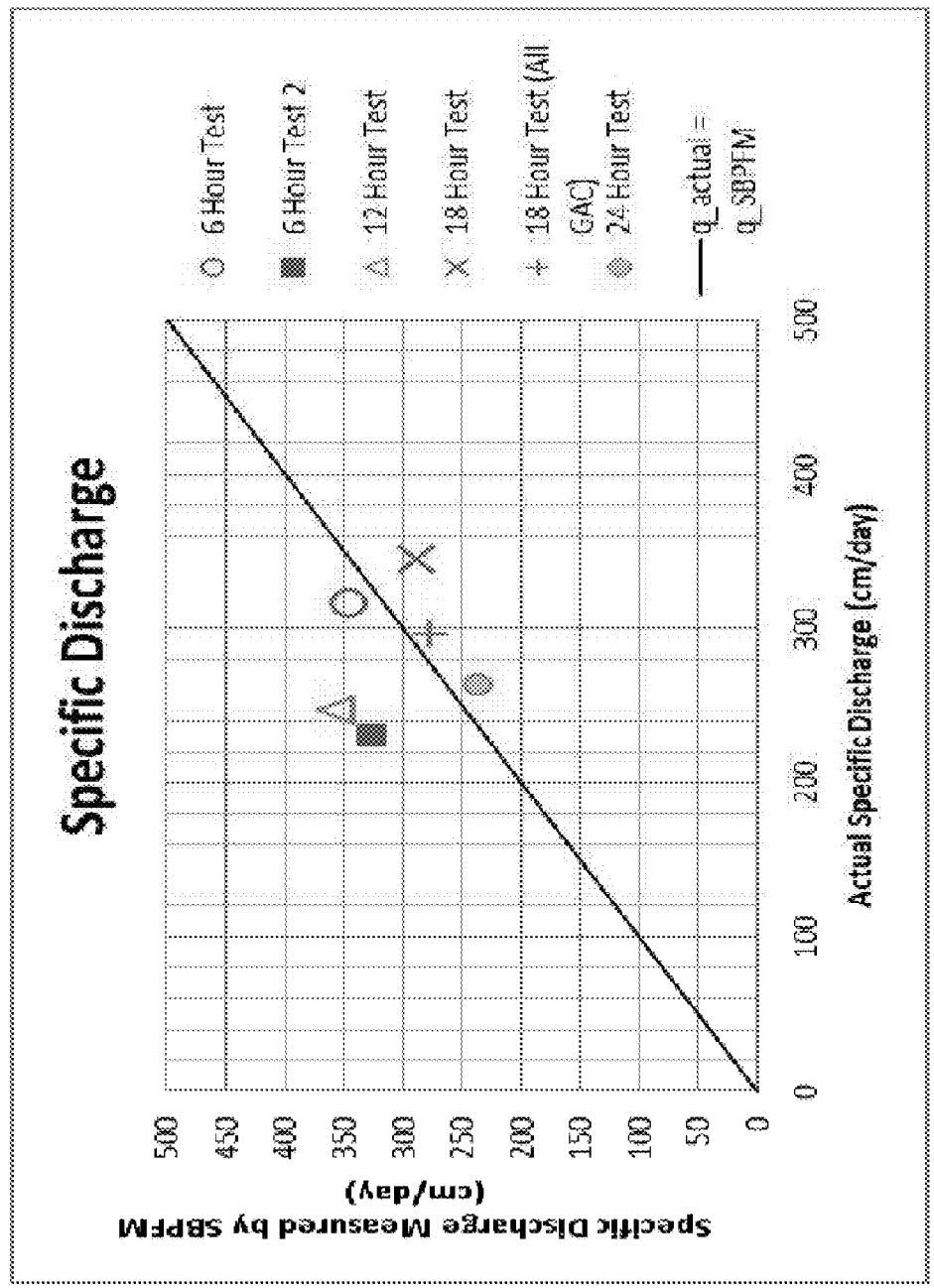
FIG. 4 is a chart illustrating exemplary results achieved via operation of the exemplary SBPFM of FIG. 1, detailing a specific discharge measured by the SBPFM as compared to an actual specific discharge, as known under test conditions.

At step 204, the SBPFM 100 is maintained in the deployed position for the observational period. The observational period may be on the length of hours to weeks. FIG. 3 illustrates the resulting mass ratio for the tracer tert-butanol measured from tests having observational periods of 6 hours, 12 hours, 18 hours, and 24 hours. FIG. 4 compares the measured specific discharge for a tracer for a set of test observational periods compared to the actual specific discharge the SBPFM was submitted to during the test observational period. Information from these charts and/or other information may be used to determine the optimal observational period for a particular set of observations. In various embodiments, the tracers used, original masses of tracers used, and/or the like may be chosen based on what is appropriate for the desired observational period.

At step 206, the SBPFM 100 is retrieved from the deployed position. At step 208, the residual mass of one or more tracers may be extracted and measured. For example, the residual tracer in the sorptive matrix of a retrieved SBPHM 100 may be extracted and measured. In various embodiments, the sorptive matrix may be analyzed in segments and the residual mass of the one or more tracers may be extracted and measured for each segment individually. In various embodiments, the residual mass of the one or more tracers may be used to determine and/or infer the information related to the flow of groundwater through the SBPFM 100 during the time the SBPFM 100 was deployed (e.g., cumulative fluid flux).

At step 210, the retained mass of one or more contaminants may be extracted and measured. For example, the SBPFM 100 may retain one or more contaminants deposited therein from groundwater flowing through the SBPFM 100. For example, retained contaminants may be present in the sorptive matrix or the inert media of the SBPFM 100 after the SBPFM is retrieved. In various embodiments, the sorptive matrix may be analyzed in segments and the retained mass of the one or more contaminants may be extracted and measured for each segment individually. In various embodiments, the retained mass of the one or more contaminants may be used to determine and/or infer the information related to the contamination of the groundwater and/or soil in the area where the SBPFM 100 was deployed.

In various embodiments, a plurality of SBPFMs 100 may be deployed for the same and/or overlapping deployment periods. The deployment positions of the plurality of SBPFMs may be spatially distributed around an area to be a sampled. For example, the plurality of deployment positions maybe spaced apart from one another and may comprise a variety of depths. The cumulative groundwater flux and contaminant mass flux information determined from each retrieved SBPFM may be used to interpolate cumulative groundwater flux and contaminant mass flux in positions between deployment positions. Thus, the plurality of SBPFMs may be used to spatially interpolate to estimate discharges throughout the spatial network covering a suspected contaminant discharge or recharge zone or stretch of a stream, such that the calculated direction and magnitudes of the cumulative vertical groundwater and contaminant mass flux may be used for the purpose of monitoring at least one of attenuation, remediation, risk, or mass balances across the spatial network.

D) Example Alternative Embodiments

Figure 5:
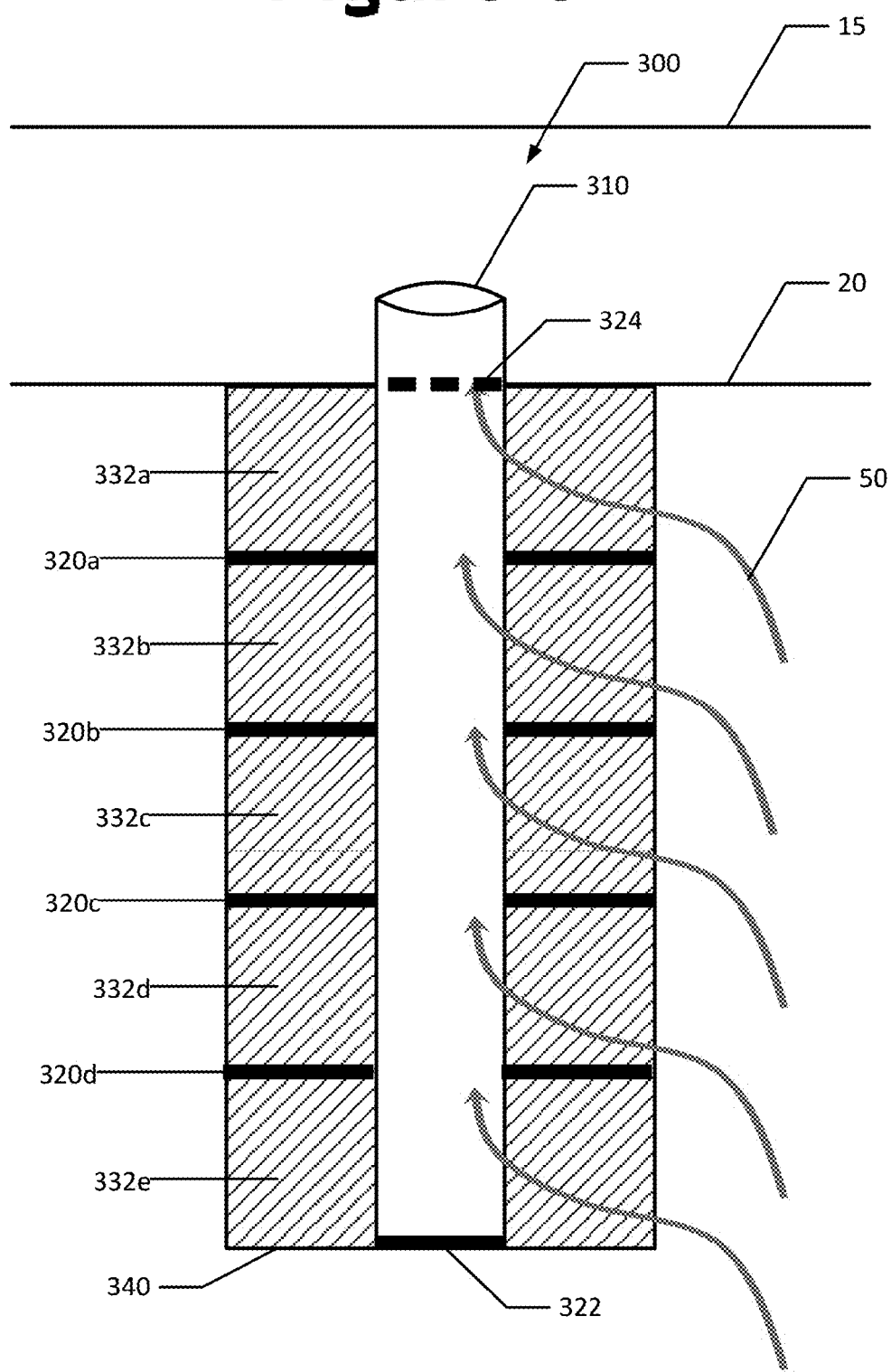
FIGS. 5 and 6 illustrate alternative embodiments of SBPFMs according to various embodiments.
Figure 6:
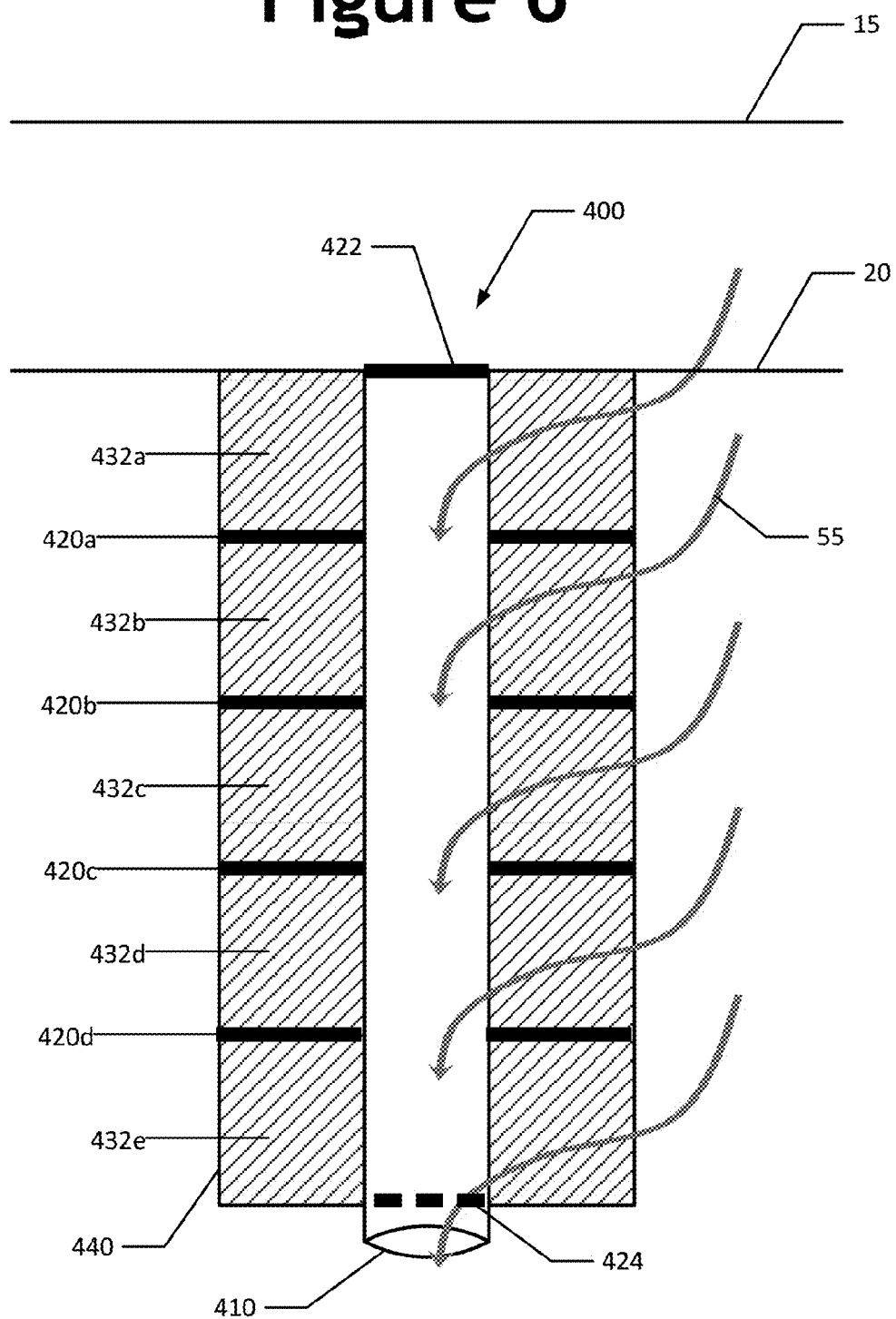

FIGS. 5 and 6 illustrate alternative embodiments of a SBPFM 300, 400. SBPFM 300 is particularly well suited for measuring upward vertical water flow and contaminant flux profiles in sediments and SBPFM 400 is particularly well suited for measuring downward vertical water flow and contaminant flux profiles in sediments. In particular, these and similar alternative embodiments may be used to measure vertical solute mass fluxes at different depths in a sediment bed. This is of interest for assessing contaminant reaction/transformation mechanisms in the hyporheic zone. Various aspects of the embodiments illustrated in FIGS. 3 and 4 will now be provided.

Similar to SBPFM 100, an upward vertical flow SBPFM 300 comprises a central tube 310, a sorptive matrix positioned in a segmented annular region (e.g., 332a-e) around the central tube 310, and an outside permeable tube or mesh 340. The outside permeable tube 340 is configured to contain the sorptive matrix and allow groundwater to pass therethrough to interact with the sorptive matrix. In various embodiments, the outside permeable tube 340 may be similar to the casing 150 and/or mesh sock 140 described above.

The sorptive matrix may be positioned in a segmented annular region around the central tube 310. For example, portions of the sorptive matrix may be disposed in segments 332a,b,c,d,e. Solid washers and/or annular discs (e.g., 320a,b,c,d) may be used to segment the annular region around the central tube 310 and within the outside permeable tube 340. The solid washers (e.g., 320a-d) may be made of rubber or other appropriate material configured to prevent groundwater and/or sorptive matrix from one annular segment from flowing into another annular segment. For example, solid washers 320a-d are impermeable to groundwater. Each of the annular segments may contain sorptive matrix impregnated with one or more tracers, as described above. In various embodiments, the impregnated sorptive matrix may comprise GAC impregnated with one or more tracers.

The central tube 310 may be a screened tube such that groundwater may flow from the annular region around the central tube 310 (e.g., from one of segments 332a-e) into the central tube 310. The bottom of the central tube 310 may be sealed to prevent groundwater from entering the central tube 310 from below. For example, a cap 322 may be used to seal the bottom of the central tube 310. The top of the central tube 310 may be open and/or comprise a screen 324 to allow water to flow up and out of the central tube 310.

Flow lines 50 illustrate the upward flow of groundwater through the outside permeable mesh 340, through one of the segments 332*a-e,* and into the central tube 310. For the sake of clarity, flow lines 50 are only illustrated on one portion of the cross-sectional view of SBPFM 300. However, in reality groundwater can flow through the SBPFM 300 from any point around the circumference of the SBPFM. When the SBPFM 300 is deployed, the top of the central tube 310 may be below the surface of the water 15 but above the top of the sediment layer 20.

A downward vertical flow SBPFM 400 is similar to a SBPFM 300 deployed upside down. For example, the SBPFM 400 comprises a central tube 410, a sorptive matrix positioned in a segmented annular region (e.g., 432*a-e*) around the central tube 410, and an outside permeable tube or mesh 440. The outside permeable tube 440 is configured to contain the sorptive matrix and allow groundwater to pass therethrough into the sorptive matrix. The sorptive matrix (e.g., GAC impregnated with one or more tracers) is disposed in annular segments (e.g., 432*a-e*) about the central tube 410 and separated by solid washers and/or annular discs 420*a-d*. The central tube 410 is a screened tube that is sealed at the top (e.g., by cap 422) and open and/or screened at the bottom (e.g., screen 424) to allow groundwater to flow into the central tube 410 from the annular segments 432*a-e* and out into the sediment. Flow lines 55 illustrate the downward flow of groundwater through the outside permeable mesh 340, through one of the segments 332*a-e,* and into the central tube 310. For the sake of clarity, flow lines 55 are only illustrated on one portion of the cross-sectional view of SBPFM 400. However, in reality groundwater can flow through the SBPFM 400 from any point around the circumference of the SBPFM. When the SBPFM 400 is deployed, the top of the central tube 410 may be below the surface of the sediment layer 20.

The illustrated SBPFM 300, 400 allow for analyzing the sorbent segments separately for sorbed contaminant masses yielding a mass flux profile with depth. For example, the sorptive matrix from each annular segment (e.g., 332*a-e* and 432*a-e*) may be analyzed separately to determine the retained contaminant mass within that annular segment. Since the vertical ground water flux should be relatively constant with depth, a very simple way of interpreting retained contaminant mass measurements might be in terms of relative contamination concentration changes with depth. For each sorbent segment, the amount of groundwater flow is known from tracer loss (e.g., ratio of original tracer mass to residual tracer mass, as described above), thus allowing for conversion of retained contaminant masses into flux average contaminant concentrations over depth. These concentration profiles are highly relevant for assessing contaminant reaction processes including loss of parent compounds and accumulation of daughter products in the sediments. Various embodiments of the SBPFM may have various numbers of segments, segments of various lengths, and/or the like as appropriate for the application.

E) Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included herein. Although specific terms are employed herein, they are used in a generic and descriptive sense only and not for purposes of limitation.

The invention claimed is:

1. A sediment bed passive flux meter (SBPFM) device, said device comprising:
    a casing, said casing comprising an intake portion, an exhaust portion, and an intermediate portion positioned between said intake and said exhaust portions;
    a permeable sock positioned within said intermediate portion; and
    a sorptive matrix positioned within said sock and impregnated with one or more tracers, such that said device is configured to passively intercept but not retain groundwater flow passing through said device from said intake portion and to said exhaust portion.

2. The device according to claim 1, further comprising at least two mesh discs, a first of said at least two mesh discs being positioned between a first end of said intermediate portion and a first end of said intake portion, a second of said at least two mesh discs being positioned between a second end of said intermediate portion and a first end of said exhaust portion, said at least two mesh discs being configured to form a permeable barrier between said intake and exhaust portions from said intermediate portion.

3. The device according to claim 2, further comprising at least two rubber caps, a first of said at least two rubber caps being positioned adjacent a second end of said intake portion opposite said first end of said intake portion, a second of said at least two rubber caps being positioned adjacent a second end of said exhaust portion opposite said first end of said exhaust portion.

4. The device according to claim 3, further comprising a plurality of beads positioned within said intake and the exhaust portions; wherein the plurality of beads are separated from said intermediate portion by said at least two mesh discs.

5. The device according to claim 4, wherein said beads are packed by compaction and vibration of said device so as to ensure a consistent density thereof within at least one of said casing or said sock.

6. The device according to claim 1, wherein at least one of said intake and exhaust portions of said casing comprise a plurality of perforations, such that said device is configured to passively facilitate a passage of groundwater flow passing into said plurality of perforations in said intake portion, through said intermediate portion, and out of said plurality of perforations in said exhaust portion.

7. The device according to claim 6, wherein said plurality of perforations comprise a plurality of spaced apart slits.

8. The device according to claim 6, wherein both of said intake and said exhaust portions include said perforations.

9. The device according to claim 6, wherein no perforations exist in said intermediate portion of said casing.

10. The device according to claim 1, wherein said casing is a cylinder and at least one of said intake and exhaust portions thereof comprise a plurality of perforations extending at least partially around a circumference of said cylinder.

11. The device according to claim 1, wherein said one or more tracers comprise at least one resident tracer and at least one internal tracer.

12. The device according to claim 1, wherein said one or more tracers comprise four resident tracers and one internal tracer.

13. The device according to claim 12, wherein:
    said four resident tracers comprise methanol, ethanol, isopropyl alcohol, and tert-butanol; and
    said one internal tracer comprises 2,4-dimethyl-3-pentanol.

14. The device according to claim 1, wherein said sorptive matrix further comprises granular activated carbon (GAC).

15. The device according to claim 1, wherein the device is configured to facilitate:
    extracting and quantitatively measuring a residual mass of said one or more tracers impregnated in said sorptive matrix so as to facilitate calculation of at least one of a direction or a magnitude of a cumulative vertical groundwater flux; and
    extracting and quantitatively measuring a retained mass of said one or more contaminants in said sorptive matrix so as to facilitate calculation of at least one of a direction or a magnitude of said cumulative vertical contaminant mass flux.

16. A method for measuring cumulative vertical groundwater and contaminant mass flux, said method comprising the steps of:
    providing at least one sediment bed passive flux meter (SBPFM) device, said device comprising:
        a casing, said casing comprising an intake portion, an exhaust portion, and an intermediate portion positioned between said intake and said exhaust portions;
        a permeable sock positioned at least within said intermediate portion; and
        a sorptive matrix positioned within said sock and impregnated with one or more tracers, such that said device is configured to passively intercept but not retain groundwater flow passing through said device from said intake portion and to said exhaust portion;
    driving the device into a deployed position in uppermost sediments at a groundwater surface water interface so as to intercept at least vertical water and contaminant mass fluxes moving through the sediments;
    maintaining said device in a stationary fashion in said deployed position for a period of time;
    removing said device from said deployed position; and
    extracting and quantitatively measuring a residual mass of said one or more tracers impregnated in said sorptive matrix so as to facilitate calculation of at least one of a direction or a magnitude of said cumulative vertical groundwater flux.

17. The method according to claim 16, wherein said device is further positioned so as to passively intercept contaminant mass fluxes moving through the sediments and said method further comprises the step of extracting and quantitatively measuring a retained mass of said one or more contaminants in said sorptive matrix so as to facilitate calculation of at least one of a direction or a magnitude of said cumulative vertical contaminant mass flux.

18. The method according to claim 16, wherein said period of time is selected from the group consisting of: one or more hours; one or more days; one or more weeks; and one or more months.

19. The method according to claim 16, further comprising the step of pre-equilibrating said sorbent matrix with one or more tracers that are leached from said sorbent matrix at rates proportional to said groundwater flux and that retains contaminants in the groundwater that flows through said device.

20. The method according to claim 16, wherein said at least one sediment bed passive flux meter (SBPFM) device comprises a plurality of SBPFM devices and said method further comprises deploying each of said plurality of SBPFM devices in distributed locations over depth spaced apart from one another.

21. The method according to claim 20, wherein said distributed locations are further spatially interpolated and integrated to estimate discharges throughout a spatial network covering a suspected contaminant discharge or recharge zone or stretch of a stream, such that the calculated directions and magnitudes of the cumulative vertical groundwater and contaminant mass flux may be used for the purpose of monitoring at least one of attenuation, remediation, risk, or mass balances across said spatial network.

22. A sediment bed passive flux meter (SBPFM) device, said device comprising:
    a permeable tube;
    a screened central tube positioned within said permeable tube such that a central axis of said permeable tube and a central axis of said screened central tube are substantially aligned, said permeable tube and said screened central tube defining an annular region therebetween; and
    a sorptive matrix positioned within said annular region and impregnated with one or more tracers, such that said device is configured to passively intercept but not retain groundwater flow passing through said device entering via said permeable tube and exiting via said screened central tube.

23. The device of claim 22 further comprising at least one solid washer, said at least one solid washer disposed within said permeable tube and configured to segment said annular region into two or more segmented annular regions, a portion of said sorptive matrix disposed within each segmented annular region, wherein said at least one solid washer is impermeable to water.

* * * * *